UNITED STATES PATENT OFFICE.

HENRY J. DETWILLER, OF ALLENTOWN, PENNSYLVANIA.

PROCESS FOR RECOVERING THE CONSTITUENTS OF ALUNITE IN TECHNICALLY USEFUL FORMS.

1,274,145.　　　　　　　　Specification of Letters Patent.　　Patented July 30, 1918.

No Drawing.　　　　Application filed October 9, 1917. Serial No. 195,554.

*To all whom it may concern:*

Be it known that I, HENRY J. DETWILLER, a citizen of the United States, residing at Allentown, Pennsylvania, have invented certain new and useful Improvements in Processes for Recovering the Constituents of Alunite in Technically Useful Forms, of which the following is a clear, full, and exact description.

This invention relates to a new and useful process for separating and obtaining in technically pure forms the chief constituents of the mineral known as alunite, and a general object of the invention is to secure in commercial forms, with a maximum of yield and a minimum of cost, all of the normal constituents of the alunite.

More particularly the invention aims to secure, as a final technical product of the process, potash, in one or more of its valuable commercial forms, and so to order and combine the various steps leading to the production of the potash that each of the constituents of the alunite separated therefrom shall be in a technically useful form and shall be separated therefrom in such manner that it can readily and economically be recovered.

In practising the process, the alunite, a hydrous potassium aluminum sulfate, is first ground to a fine powder. This powder is digested, under constant agitation, with boiling nitric acid. The agitation may be effected by means of steam from which also the heat for boiling may be obtained. All of the potassium and aluminum present enter into solution as nitrates and sulfates. The small amount of silica ordinarily present in alunite, after filtration and washing with water, is obtained as a residual white powder in a form having a wide technical application.

From the filtrate, all of the aluminum present in solution, is precipitated by the addition of barely sufficient ammonia, under constant agitation. For reasons hereinafter set forth, when utilizing this process on a commercial scale, it may be preferable to employ caustic potash at this stage of the process, instead of ammonia, to precipitate the aluminum hydroxid.

The precipitate of aluminum hydroxid, after filtration and washing with water, is obtained in a technically pure form, and is readily transformed into alumina on heating and driving off the water of combination.

The filtrate obtained on the removal of the aluminum hydroxid, is treated in a suitable tank under constant agitation and boiling, with powdered barium carbonate, in barely sufficient amount to completely precipitate all sulfuric acid present in combination.

The precipitate of finely divided barium sulfate thus obtained, is washed with water, filtered and dried. It constitutes the well-known blanc fixe, or precipitated barium sulfate of commerce. The residual solution remaining after the removal of the barium sulfate by precipitation, contains potassium and ammonium nitrates and carbonates.

The carbonic acid, or carbon dioxid, present, is removed by the addition of nitric acid in barely sufficient amount. The solution then contains potassium nitrate. From this solution the potassium nitrate is readily obtained, in a technically pure form, by concentration and crystallization. From the mother liquors remaining after the removal of the crystals of potassium nitrate, the nitric acid and the ammonia present, in the form of ammonium nitrate, are successively recovered by the methods in current use, and are employed again in the preliminary reactions of the process.

In order to insure a higher economy of separation at the last stage under certain conditions, use is made of the fact that ammonium carbonate is decomposed in boiling water, and that ammonium nitrate and ammonium carbonate are soluble in alcohol, while the corresponding potassium salts are insoluble.

As hereinabove suggested, in the precipitation of aluminum hydroxid, caustic potash, recovered from the final product by the customary method, may be employed, under certain conditions, in lieu of ammonia, thus insuring the presence, in the final solution, after the removal of barium sulfate, of potassium salts only.

The technical products thus successively obtained from alunite are:—

Silica: of widespread use in the manufacture of water glass and a polish for glass and metals;

Alumina: used on a large scale for the manufacture of metallic aluminum, the various alums, aluminum sulfate and closely allied substances;

Barium sulfate: of extended use as a pigment and as a size;

Potassium nitrate: of widespread use in the manufacture of gunpowder and blasting powder, as an antiseptic and a refrigerant, capable of transformation, with recovery of nitric acid, into the various potassium salts required in the arts.

From the foregoing description it will be seen that this process provides for the recovery, on a commercial scale and at a minimum of expense, of all the constituent contents of the mineral alunite in technically pure forms of standard commercial value and widespread use. Moreover, by the use of nitric acid, as a solvent for the alunite, the process insures the economic recovery of the potash present in the valuable commercial form of potassium nitrate or saltpeter.

Other important commercial advantages of the novel sequence and combination of the various operations are the recovery of all of the silica present in the alunite in a commercially valuable form, and also the recovery in the valuable commercial form of blanc fixe, of all of the sulfuric acid present in alunite in a combined form and which, ordinarily, in the current methods of treating alunite is allowed to escape as a wasted and noxious gas.

This application is a continuation in part of my application Serial Number 106,114, filed June 27, 1916, for Letters Patent for improvements in processes for separating useful products from alunite.

What I claim as new is:—

1. The process of obtaining potassium nitrate from alunite, which comprises digesting the powdered mineral in boiling nitric acid, removing the residual silica from the resultant solution and also successively removing by precipitation and filtration aluminum hydroxid and all sulfates, again adding nitric acid and crystallizing out the potassium nitrate from the mother liquor thus produced.

2. The process of treating alunite to recover therefrom its constituents in technically useful forms, which consists in digesting the powdered mineral in boiling nitric acid under constant agitation, recovering the residual silica from the resultant solution by filtration, precipitating the aluminum in the filtrate and recovering it by filtration in the form of aluminum hydroxid, recovering the precipitated barium sulfate by the addition of barium carbonte and by filtration, and crystallizing out the potassium salts from the resultant mother liquor.

3. The process of treating alunite to recover therefrom its constituents in technically useful forms, which consists in digesting the powdered mineral in a boiling acid under constant agitation, removing from the resultant solution the residual silica, hydrating the aluminum and recovering it by filtration in the form of aluminum hydroxid, treating said filtrate with barium carbonate and recovering therefrom by filtration the precipitated barium sulfate, adding more of the original acid solvent, and crystallizing out the potassium salts from the mother liquor thus produced.

4. The process of treating alunite, which comprises digesting the mineral in nitric acid, removing from the resultant solution the residual silica, adding an alkali and then removing the precipitated aluminum hydroxid, adding barium carbonate and then removing the precipitated barium sulfate, adding nitric acid to remove the carbonic acid and then crystallizing out the potassium nitrate.

5. The process of treating alunite to recover therefrom its constituents in technically useful forms, which consists in digesting the powdered mineral in boiling nitric acid under constant agitation, recovering the residual silica from the resultant solution by filtration, treating this filtrate with ammonia and recovering therefrom by filtration the precipitated aluminum hydroxid, treating the last mentioned filtrate with barium carbonate and recovering therefrom by filtration the precipitated barium sulfate, treating the filtrate thus obtained with nitric acid, and crystallizing out the potassium nitrate.

6. The process of treating alunite to recover therefrom its constituents in technically useful forms, which consists in digesting the powdered mineral in boiling nitric acid under constant agitation, recovering the residual silica from the resultant solution by filtration, treating this filtrate with an alkali under constant agitation, and recovering therefrom by filtration the precipitated aluminum hydroxid, treating the last-mentioned filtrate with powdered barium carbonate under constant agitation and boiling, and recovering therefrom by filtration the precipitated barium sulfate, treating the filtrate thus obtained with nitric acid, and crystallizing out the potassium nitrate.

Signed at New York, N. Y., this 8" day of October, 1917.

HENRY J. DETWILLER.